United States Patent [19]
Caputi

[11] Patent Number: 5,980,260
[45] Date of Patent: Nov. 9, 1999

[54] INTER ORDER/FAMILY PREHISTORIC LIZARD DISPLAY MODEL

[76] Inventor: Claude G. Caputi, 4016 Salem St., Concord, Calif. 94521

[21] Appl. No.: 08/959,333

[22] Filed: Oct. 28, 1997

[51] Int. Cl.[6] .............................. G09B 23/36; A63H 3/16
[52] U.S. Cl. ...................... 434/295; 446/100; 446/101; 446/321; 446/368
[58] Field of Search ................ 446/104, 97, 99, 446/100, 101, 268, 321, 368, 370, 373, 378; 434/295

[56] References Cited

U.S. PATENT DOCUMENTS

| | | | |
|---|---|---|---|
| 3,375,604 | 4/1968 | Alonso | 446/97 |
| 4,038,775 | 8/1977 | Satoh | 446/97 |
| 4,118,888 | 10/1978 | Ogawa | 46/241 |
| 4,170,840 | 10/1979 | Ogawa | 446/97 |
| 4,846,689 | 7/1989 | Day | 434/190 |
| 5,378,184 | 1/1995 | Baerenwald | 446/97 |
| 5,480,341 | 1/1996 | Plakos | 446/373 |
| 5,681,041 | 10/1997 | Coon | 273/157 R |
| 5,752,869 | 5/1998 | Huff | 446/104 |

*Primary Examiner*—Robert A. Hafer
*Assistant Examiner*—Kurt Fernstrom
*Attorney, Agent, or Firm*—Jack Lo

[57] ABSTRACT

Replicas of prehistoric lizards which consist of a replica core body part with interchangeably attachable replica head, and/or neck, and/or limb, and/or body armor parts which combine to depict different species within a given biological Order or Family. ¾" circular magnets 11 are applied to appropriate surfaces on the replica core body parts and replica head, neck, limb, or body armor parts, allowing the parts to attach and detach quickly and easily.

6 Claims, 5 Drawing Sheets

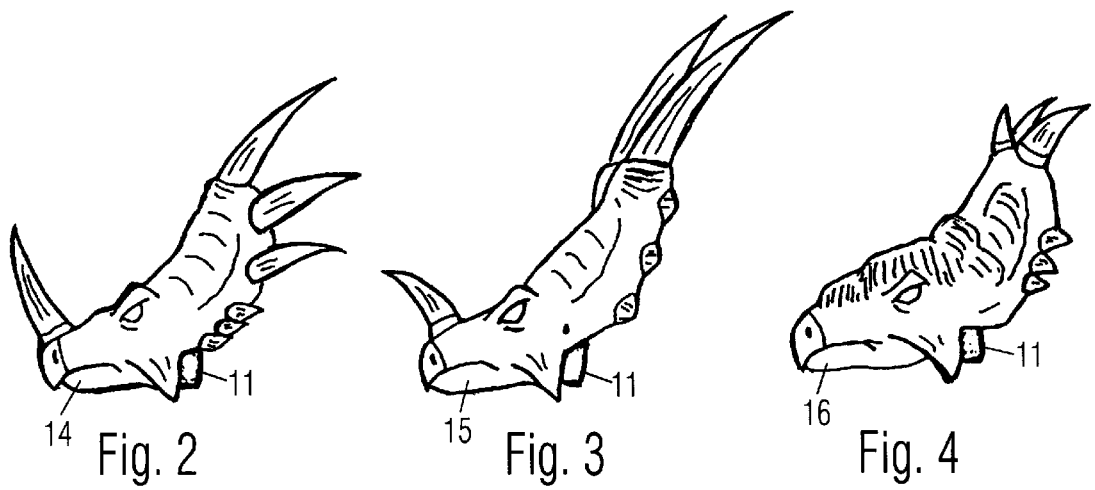
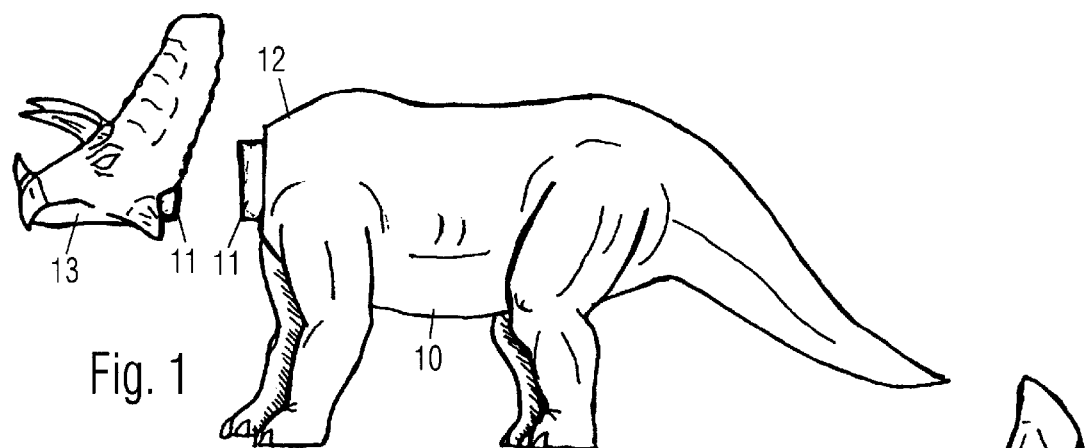
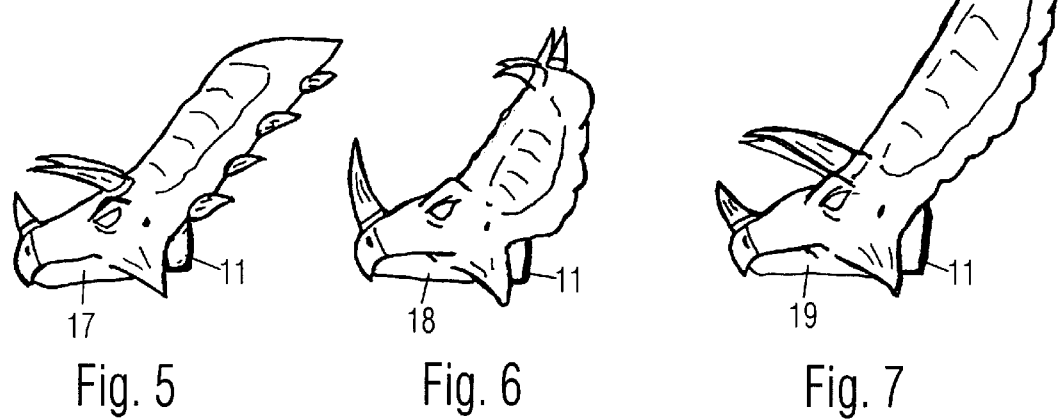

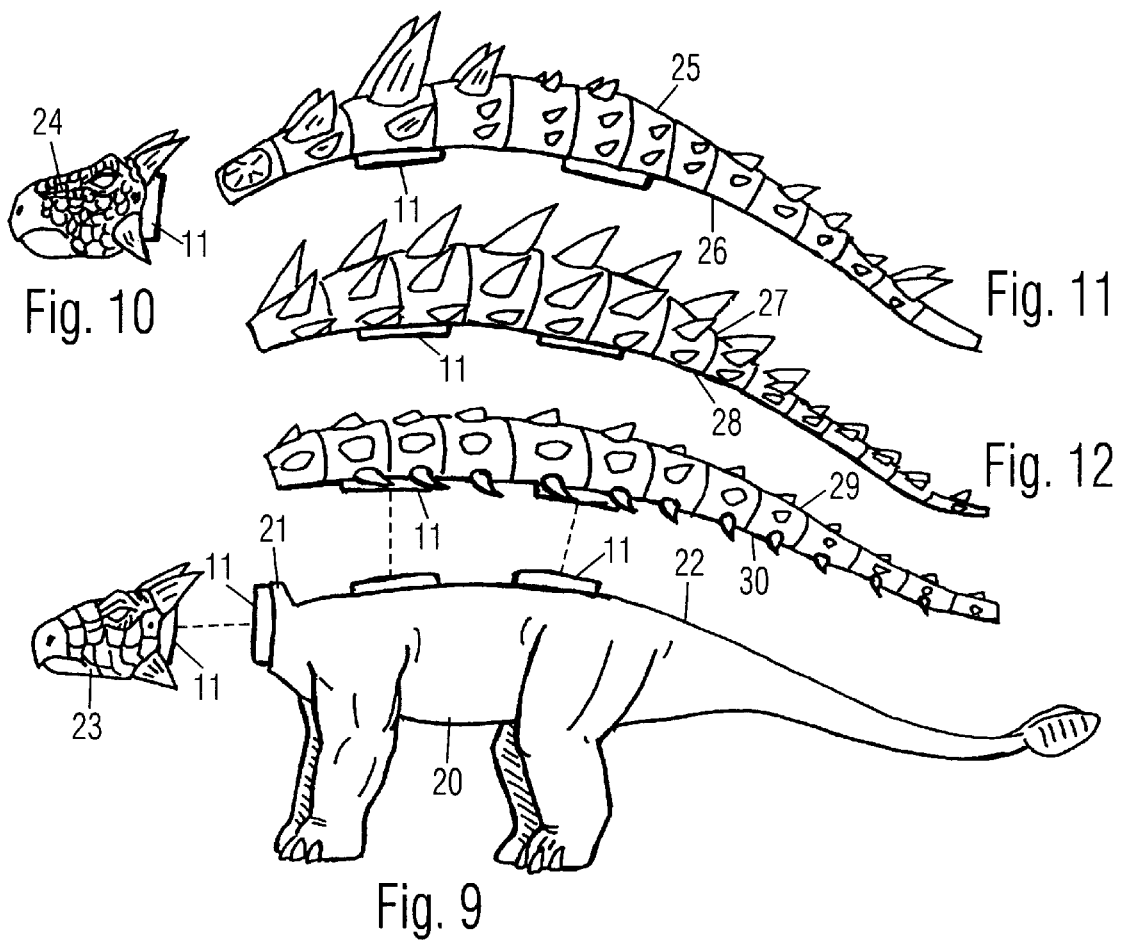

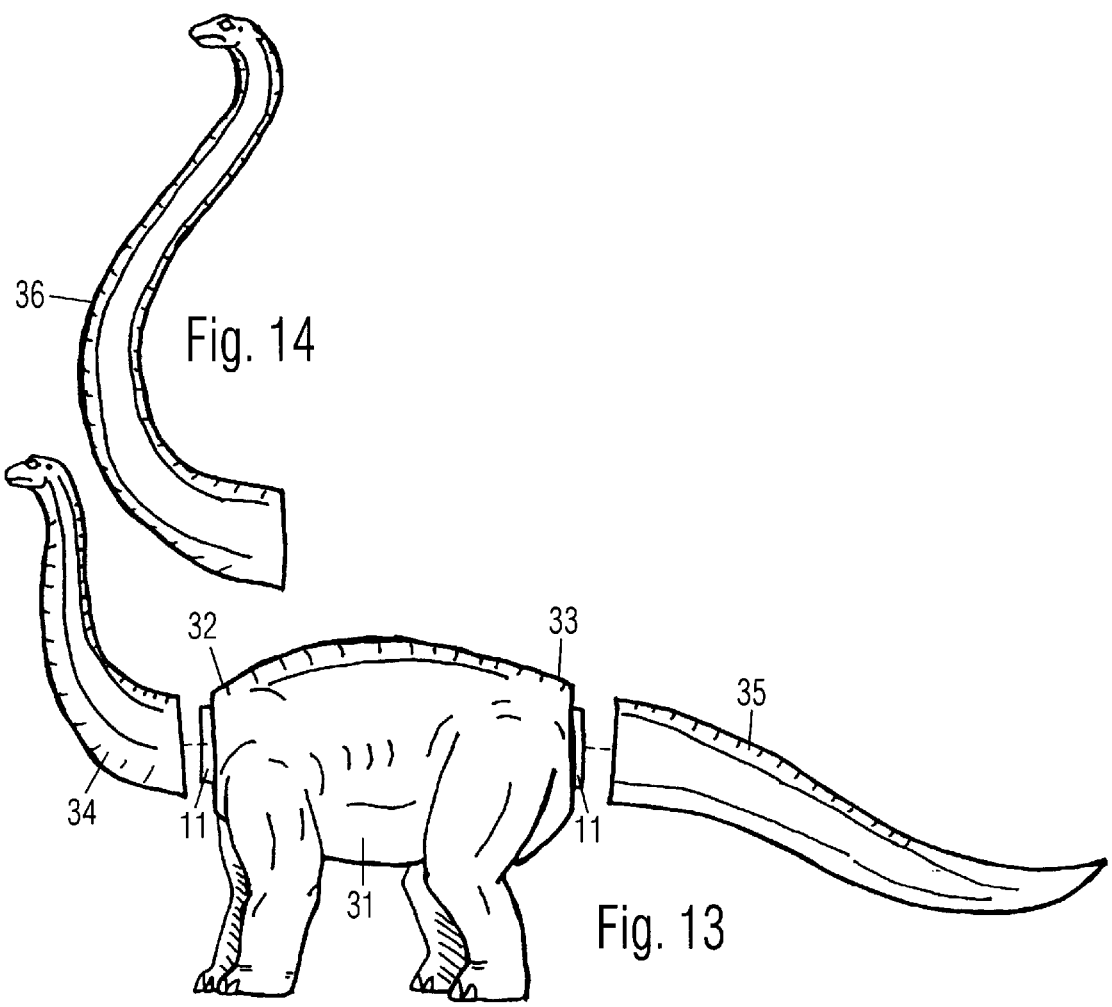
Fig. 14
Fig. 13
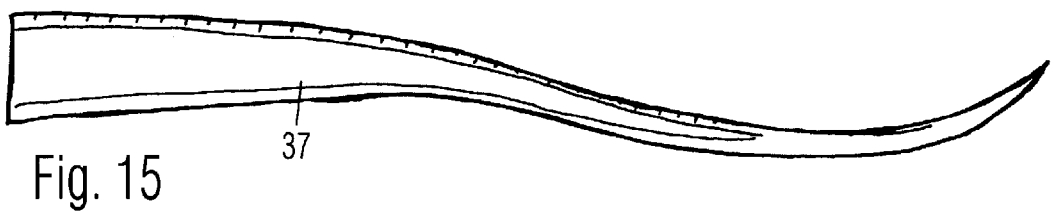
Fig. 15
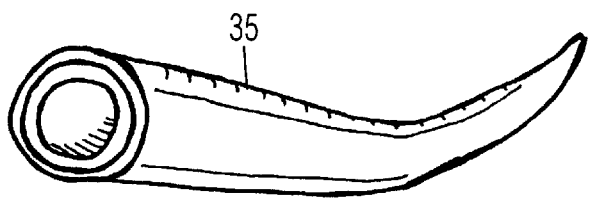
Fig. 16

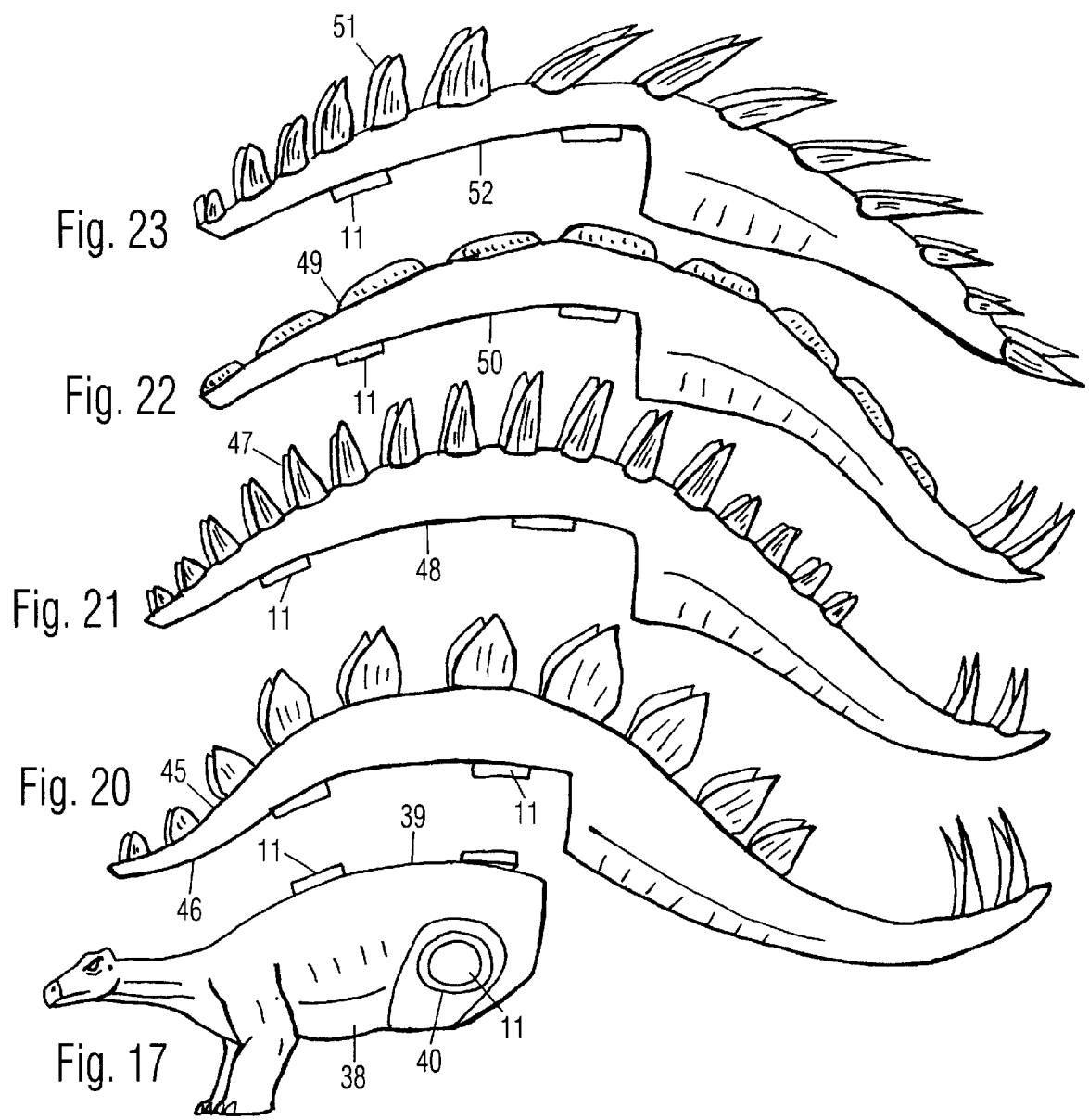
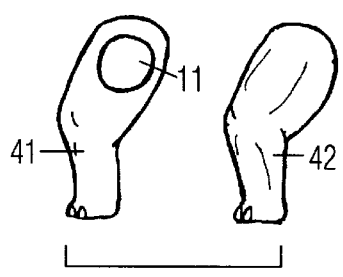
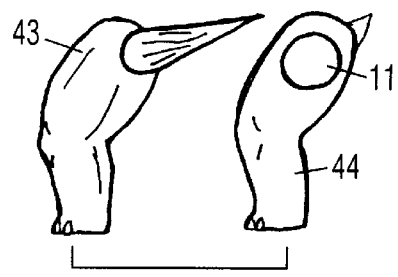

INTER ORDER/FAMILY PREHISTORIC LIZARD DISPLAY MODEL

BACKGROUND OF INVENTION

1. Field of Invention

This invention relates to model replicas of species of animals either used for amusement or educational aids.

2. Description of Prior Art

For students and admirers of prehistoric lizards, there are a multitude of scale model replicas to choose from in the marketplace. Yet, manufacturers tend to produce similar models of the same species year after year. Out of the hundreds of prehistoric animals recorded in the annals of science, perhaps thirty or forty species have been tooled for the general market. Most companies probably think it impractical to produce replicas of species which the non-scientific community may not be familiar with. Those specialty manufacturers, (usually affiliated with famous museums) which do choose to produce replicas of more exotic species, charge so much more for their products, that the average consumer will tend to forego purchasing them, and will opt for some inexpensive product which is usually of much lower quality. An entire set of quality museum replicas costs well over one-hundred dollars, while the mass-market "dinosaur set", will cost only ten or twenty dollars. The prehistoric animal enthusiast of modest economic means is at somewhat of a disadvantage, having to pay much more than necessary for variety and quality.

The Inter-Order/Inter-Family display models that this designer has developed will allow the prehistoric animal enthusiast to collect a variety of quality replicas at a significantly lower cost. Many exotic species of prehistoric lizards within an order, family, or species had similar body types. Characteristic evolutionary changes occurred in head shape, length of neck, tails, or limbs, or in patterns of body armor. The proposed Inter-Order/Inter-Family display models consist of core bodies with interchangeable heads, necks, tails, limbs, or body armor. Thus, depending on the particular model, the enthusiast may display for their knowledge and enjoyment, several different species within a given order or family, using a core body and its changeable parts. For roughly the same cost as one quality replica on the market now, one of my replicas might provide up to seven species options in one package.

The prototypes developed thus far make use of permanent magnets to fasten the various parts to the core body, although it would be just as easy to use many other means of fastening these elements, (e.g. ball and socket, specially shaped fittings, etc.) Being aware of prior art making use of magnetic fastening, or any other fastening means to provide for interchangeable parts, this designer has done all possible research within his means to determine the novelty of these means as applied to replicas which allow the display of actual biological species differences. This designer believes his product to be the first of its kind. Many inventors have made toys and models with interchangeable parts, but they do not seem to have applied interchangeability to educational models of real prehistoric (or contemporary) animal species to impart knowledge, as well as amusement.

Interchangeability of parts adds a dynamic element to models. In Japan, the Takara corporation made interchangeability of parts the defining characteristic of their toy lines (4,118,888). Making use of magnets and universal connection parts, one line of toys was interchangeable with the next and offered the consumer an amazing number of possible variations to build. As stimulating as this is for the imagination, it does not come close to the goal of my Inter-Order/family species display models, which is to use interchangeability of parts to display certain, scientific realities. Because the products of the Takara corporation depict fanciful, science fiction-type entities, there is no relation between our products whatsoever. The other references cited (5,378,784 and 4,846,689) have no relation in exact method or subject matter to my invention. Therefore comparison is not necessary.

I cite the following prior art as references: 5,378,184; 4,846,689; and 4,118,888.

OBJECTS AND ADVANTAGES

In my research I have not been able to find any prior art which accomplishes what my product does, namely:

a) It adds the interesting aspect of interchangeability to the subject of prehistoric lizards. In a field congested with prior art, I could not find any precedent.

b) It displays evolutionary relations of certain species within a given Order or Family of prehistoric animals in an efficient way. A teacher using this style of display model in a lecture could easily switch parts in mere seconds to display the relations and differences of the varying species. They would not need to carry, organize, and make space for as many separate species replicas.

c) Whether used as a toy or educational prop it would save money. Instead of paying more money for individual replicas, the consumer would pay for many species options at one price. Parents and teachers would appreciate this.

d) Finally shows a way of producing replicas of exotic and neglected species that is cost effective to the manufacturer.

e) Consumers would have access to a more complete set of dinosaurs without having to spend time and money looking for certain species individually. Most often quality replicas are sold individually, without packaging, from bins. Many times a desired favorite is sold out. Or stores only re-stock those replicas which are good sellers. In buying my replicas, purchasers would not undergo the inconvenience of searching for or waiting for models to complete a set.

f) When scientists discover new species within an order or family, new parts can be manufactured to accommodate this new scientific data and complement the existing replica sets. This will allow sets to be up-to-date scientifically.

SUMMARY OF THE INVENTION

As developed thus far, the Inter Order/Family display model comprises a sculpted replica core body part, and sculpted replica head, neck, tail, limb, or body armor parts, which have magnetic or other fastening means, allowing for interchangeability. Depending on which combination of head, neck, tail, limb, or body armor parts are fastened to the core body part, different species of prehistoric animals within a given biological order or family are depicted, illustrating evolutionary characteristics in a novel and efficient manner.

BRIEF DESCRIPTION OF THE DRAWING FIGURES

FIG. 1 shows an exploded view of a Ceratopidae Family display model.

FIG. 2 shows an alternative head part for the Ceratopidae Family display model.

FIG. 3 shows an alternative head part for the Ceratopidae Family display model.

FIG. 4 shows an alternative head part for the Ceratopidae Family display model.

FIG. 5 shows an alternative head part for the Ceratopidae Family display model.

FIG. 6 shows an alternative head part for the Ceratopidae Family display model.

FIG. 7 shows an alternative head part for the Ceratopidae Family display model.

FIG. 9 shows an exploded view of an Ankylosauridae Family display model.

FIG. 10 shows an alternative head part for the Ankylosauridae Family display model.

FIG. 11 shows an alternative body armor part for the Ankylosauridae Family display model.

FIG. 12 shows an alternative body armor part for the Ankylosauridae Family display model.

FIG. 13 shows an exploded view of a Diplocidae Family display model.

FIG. 14 shows an alternative head part for the Diplocidae Family display model.

FIG. 15 shows an alternative tail part for the Diplocidae Family display model.

FIG. 16 shows a front perspective view of the tail part for the Diplocidae Family display model.

FIG. 17 shows a side view of a Stegosauridae Family display model.

FIG. 18 shows a pair of hind legs for the Stegosauridae Family display model.

FIG. 19 shows an alternative pair of hind legs for the Stegosauridae Family display model.

FIG. 20 shows an alternative body armor and tail part for the Stegosauridae Family display model.

FIG. 21 shows an alternative body armor and tail part for the Stegosauridae Family display model.

FIG. 22 shows an alternative body armor and tail part for the Stegosauridae Family display model.

FIG. 23 shows an alternative body armor and tail part for the Stegosauridae Family display model.

DETAILED DESCRIPTION OF THE DRAWINGS

Figure 8:
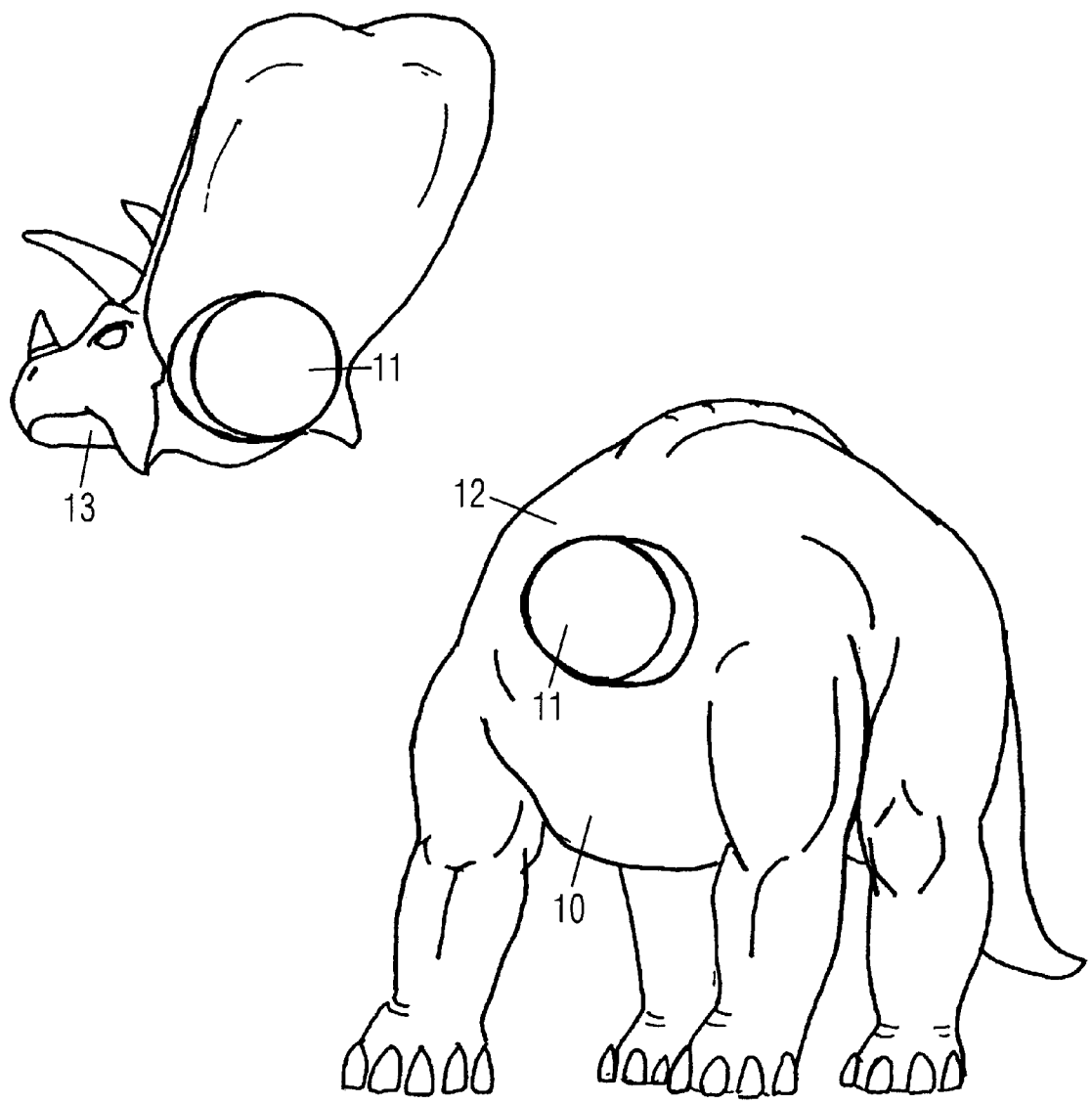
FIG. 8 shows an exploded view of the Ceratopidae Family display model.

The prototype of a Ceratopidae Family model is shown in a side view in FIG. 1. It includes a replica core body part 10, which has a ¾' circular magnet 11 attached to a neck area 12. A replica head part 13 of the species Triceratops has a ¾" circular magnet 11 attached to the back portion of it. FIG. 2 shows a replica head part 14 of the species Styracosaurus, with a ¾" circular magnet 11 attached to the back portion of it. FIG. 3 shows a replica head part 15 of the species Einiosaurus with a ¾" circular magnet 11 attached to the back portion of it. FIG. 4 shows a replica head part 16 of the species Pachyrhinosaurus, with a ¾" circular magnet 11 attached to the back portion of it. FIG. 5 shows a replica head part 17 of the species Chasmosaurus with a ¾" circular magnet 11 attached to the back portion of it. FIG. 6 shows a replica head part 18 of the species Monoclonius, with a ¾" circular magnet 11 attached to the back portion of it. FIG. 8 shows a replica head part 19 of the species Torosaurus with a ¾" circular magnet 11 attached to the back portion of it.

FIG. 8 is a perspective view of replica head part 13 and replica core-body part 10. This exemplar view shows the simple means by which any head part can be joined to core body part 10 to represent the different species.

FIG. 9 is a side view of an Ankylosauridae Family prototype. A replica core body part 20 which has a ¾" circular magnet 11 attached to a neck portion 21, and a pair of ¾" circular magnets 11 attached to a top portion 22. A replica head part 23 represents two species, Ankylosaurus and Talarurus. A ¾" circular magnet 11 is attached to the back portion of head part 23. FIG. 10 shows a replica head part 24 of the species Euoplocephalus, which has a ¾" circular magnet 11 attached to the back portion. FIG. 11 shows a replica body armor part 25 of the species Euoplocephalus with a pair of ¾" circular magnets 11 on an underside portion 26. FIG. 12 shows a replica body armor part 27 of the species Talarurus with a pair of ¾" circular magnets 11 on an underside portion 28. FIG. 9 includes a replica body armor part 29 of the species Ankylosaurus with a pair of ¾" circular magnets 11 on an underside portion 30.

FIG. 13 shows a side view of a Diplodocidae Family model. A replica core body part 31 has a ¾" circular magnet 11 on a front portion 32 (neck area) and a ¾" circular magnet on a rear portion 33 (tail area). A replica head/neck part 34 is of the species Bronotsarus. A replica tail part 35 is also included. FIG. 14 shows a replica head/neck part 36 of the species Diplodocus. FIG. 15 shows an alternative tail part 37. FIG. 16 shows a perspective view of tail part 35 where space is extruded in the front portion in order to set a ¾" circular magnet 11 in it. This allows the magnet on the rear portion of core body part 31 (FIG. 13) to attach with it in such a way that it hides the attachments of the parts from view and preserves the aesthetic integrity of the model. The same extrusion method is applied to the head/neck parts 34 (FIG. 13) and 36 (FIG. 14) for the same purpose.

FIG. 17 is a side view of a Stegosauridae Family model. A replica core body part 38 has a pair of ¾" circular magnets 11 on an upper back portion 39 on it, and a ¾" circular magnet 11 in extruded portions 40 on each side of core body part 38 where replica hind limb parts fit and attach. FIG. 18 shows left and right hind limb parts 41 and 42 representing the species Stegosaurus, Tuojiangosaurus, and Wuerhosaurus. FIG. 19 shows left and right hind limb parts 43 and 44 of the species Kentrosaurus. In FIGS. 18 and 19, the replica hind limb parts have ¾" circular magnets 11 attached to them. FIG. 20 shows a replica body armor/tail part 45 of the species Stegosaurus with a pair of ¾" circular magnets 11 attached to an underside portion 46 of it. FIG. 21 shows a replica body armor/tail part 47 of the species Tuojangosaurus with a pair of ¾" circular magnets 11 attached to an underside portion 48 of it. FIG. 22 shows a replica body armor/tail part 49 of the species Wuerhosaurus with a pair of ¾" circular magnets 11 attached to an underside portion 50 of it. FIG. 10 shows a replica body armor/tail part 51 of the species Kentrosaurus with a pair of ¾" circular magnets 11 attached to an underside portion 52 of it.

In all probability, these models would be reproduced and cast in some form of polyurethane, although any non-hazardous castable material could be chosen. As long as the material were durable and non-hazardous it could be cast. The original prototypes are made of a polymer rubber. An epoxy compound binds the circular magnets onto the head and core body parts, but again, there are many adhesive substances that can be used for such industrial purposes. The models would be painted with a non-toxic acrylic paint to add detail. The prototypes are made at approximately $\frac{1}{60}^{th}$–$\frac{1}{100}^{th}$ scale, however they could be produced in any scale deemed adequate. High quality permanent magnets are used as the means of fastening the parts.

Operation

The mode of operation of the Inter-Order/Family display model is self explanatory as shown in FIGS. 1–3. In FIG. 1 we see that replica head parts 2, 3, 4, 5, 6, 7, and 8, attach to the core body part 1, by means of the ¾" circular magnets (9), to create seven species options. FIGS. 2A and 2B show the simple positioning of magnets (9) on a body part 1 and a body part 2. FIG. 3 shows two head parts, 2 and 3, which connect to the front portion of a core body part 1, and it shows body armor parts 4, 5, and 6, which connect to the top portion of core body part 1. These various parts connect to create three species options. FIG. 4 shows the operation of a Diplodocidae Family model. Head/neck parts 2 and 3 attach to the front of the core body part 1, while tail parts 4 and 5 attach to the rear portion of the core body part. These parts connect to create two species options. FIG. 5 shows the operation of the Stegosauridae Family model. Replica body armor/tail parts 4, 5, 6, and 7 attach to the upper portion of core body part 1. Replica hind limb parts 2, 3, 4, and 5 attach to the left or right sides of the appropriate extruded areas of part 1.

Conclusion, Ramifications, and Scope

By looking at the drawings, one can see that the Inter-Order/Family display is a very simple invention, but it is also very unique. It is bound to make headway in a market that has all but exhausted the possibilities of the traditional approach to prehistoric animal models. It will appeal to the enthusiast who knows a great deal about the subject matter, allowing them to display a broader range of species, but it will also create new enthusiasts by introducing them to the unknown species which are related to ones that they know. Both the expert and the neophyte will appreciate that they do not have to buy individual models of species at a higher cost, but can buy many species models in one package. (Without having to expend time and energy to complete a set.) As a toy or educational prop the Inter-Order/Family display model offers more product for less cost.

The embodiments of the invention shown in FIGS. 1–3 should not be taken as the final examples by any means. The means of operation employed in the Ceratopidae, Ankylosauridae, Diplodocidae, and Stegosauridae display models can also be applied to the following groupings of biological Orders/Families and these species within them:

Order Carnosauridae: Allosaurus, Dilophosaurus, Ceratosaurus, and Camotaurus

Family Hadrosauridae: Hadrosaurus, Corythosaurus, Lambeosaurus, Parasaurolophus

Family Pacyccphalosauridac: Pacyccphalosaurus, Homalocephalc, Prenocephale, and Stegoceras Order Pterosauna: Rhamphorynchus, Pterodactylus, Pterodaustro, Dsungaripterus, and Ptemodon Family Pelycosauria: Edaphosaurus and Dimetrodon Family Pareiasauridae: Pareiasaurus and Scutosaurus Family Nodosauridae: Hylaeosaurus, Silvisasaurus, Panaplosaurus, and Nodosaurus Family Iguanodontidae: Iguanodon, Ouranosaurus, Muttaburrasaurus Family Spinosauridac: Spinosaurus, Acrocanthosaurns A great many possibilities present themselves for the development of an innovative product line.

Different designs could evolve, most notably, models with articulated limbs, necks, tails or jaws. This would enhance performance as a toy. Perhaps an exceptionally high-grade version of the models could be produced in bronze or cold-cast marble, One design in progress would take into account different scientists' opinions of how' a species appeared, and if a new species is discovered or unearthed, then a replica part can be manufactured and made to add to the appropriate Inter-Order/Family display set. In this manner a set can be up to date with new scientific data. There is definitely no precedent for this in the toy industry. This style of display model also lends itself to the subject matter of contemporary animal species. For example, African and Indian Elephants have similar bodies, but different heads. Many other examples could be found for manufacture. Like the evolutionary process itself, this line of display models could produce a range of varied, interesting results.

The preceding descriptions should not be construed as limiting the scope of the invention, but as merely describing the present embodiment. For example, magnetic attachments are not essential to the goal of this invention. Many other methods could provide interchangeability of the parts. Thus the scope of the invention should be determined by the claims.

I claim:

1. An animal modeling system, comprising:

a generally taxonomically accurate core body part common to a plurality of different species within an order of animals; and a plurality of generally taxonomically accurate versions of a peripheral body part corresponding to said different species;

wherein said versions of said peripheral body part are interchangeably attached to said core body part to produce generally taxonomically accurate complete models corresponding to said different species within said order of animals for showing the taxonomical relationships between said species.

2. The animal modeling system of claim 1, wherein said species of said animals are selected from a group consisting of:

A. Order Carnosauridae, including the species Allosaurus, Dilophosaurus, Ceratosaurus, and Camotaurus;

B. Family Hadrosauridae, including the species Hadrosaurus, Corythosaurus, Lambeosaurus, and Parasaurolophus;

C. Family Pacyccphalosauridac, including the species Pacyccphalosaurus, Homalocephalc, Prenocephale, and Stegoceras;

D. Order Pterosauna, including the species Rhamphorynchus, Pterodactylus, Pterodaustro, Dsungaripterus, and Ptemodon;

E. Family Pelycosauria, including the species Edaphosaurus and Dimetrodon;

F. Family Pareiasauridae, including the species Pareiasaurus and Scutosaurus;

G. Family Nodosauridae, including the species Hylaeosaurus, Silvisasaurus, Panaplosaurus, and Nodosaurus;

H. Family Iguanodontidae, including the species Iguanodon, Ouranosaurus, and Muttaburrasaurus;

I. Family Spinosauridac, including the species Spinosaurus, and Acrocanthosaurns.

3. An animal modeling system, comprising:

a generally taxonomically accurate core body part common to a plurality of different species within an order of animals;

a plurality of generally taxonomically accurate head parts corresponding to said different species; and a plurality of generally taxonomically accurate body armor parts corresponding to said different species;

wherein said head parts and said body armor parts are interchangeably attached to said core body part to produce generally taxonomically accurate complete models corresponding to said different species within said order of animals for showing the taxonomical relationships between said species.

4. The animal modeling system of claim 3, wherein said species of said animals are selected from a group consisting of:

A. Order Carnosauridae, including the species Allosaurus, Dilophosaurus, Ceratosaurus, and Carnotaurus;

B. Family Hadrosauridae, including the species Hadrosaurus, Corythosaurus, Lambeosaurus, and Parasaurolophus;

C. Family Pacyccphalosauridac, including the species Pacyccphalosaurus, Homalocephalc, Prenocephale, and Stegoceras;

D. Order Pterosauna, including the species Rhamphorynchus, Pterodactylus, Pterodaustro, Dsungaripterus, and Ptemodon;

E. Family Pelycosauria, including the species Edaphosaurus and Dimetrodon;

F. Family Pareiasauridae, including the species Pareiasaurus and Scutosaurus;

G. Family Nodosauridae, including the species Hylaeosaurus, Silvisasaurus, Panaplosaurus, and Nodosaurus;

H. Family Iguanodontidae, including the species iguanodon, Ouranosaurus, and Muttaburrasaurus;

I. Family Spinosauridac, including the species Spinosaurus, and Acrocanthosaurns.

5. An animal modeling system, comprising:

a generally taxonomically accurate core body part common to a plurality of different species within an order of animals;

a plurality of generally taxonomically accurate head parts corresponding to said different species;

a plurality of generally taxonomically accurate limb parts corresponding to said different species; and a plurality of generally taxonomically accurate body armor parts corresponding to said different species;

wherein said head parts, said limb parts, and said body armor parts are interchangeably attached to said core body part to produce generally taxonomically accurate complete models corresponding to said different species within said order of animals for showing the taxonomical relationships between said species.

6. The animal modeling system of claim 5, wherein said species of said animals are selected from a group consisting of:

A. Order Carnosauridae, including the species Allosaurus, Dilophosaurus, Ceratosaurus, and Carnotaurus;

B. Family Hadrosauridae, including the species Hadrosaurus, Corythosaurus, Lambeosaurus, and Parasaurolophus;

C. Family Pacyccphalosauridac, including the species Pacyccphalosaurus, Homalocephalc, Prenocephale, and Stegoceras;

D. Order Pterosauna, including the species Rhamphorynchus, Pterodactylus, Pterodaustro, Dsungaripterus, and Pternodon;

E. Family Pelycosauria, including the species Edaphosaurus and Dimetrodon;

F. Family Pareiasauridae, including the species Pareiasaurus and Scutosaurus;

G. Family Nodosauridae, including the species Hylaeosaurus, Silvisasaurus, Panaplosaurus, and Nodosaurus;

H. Family Iguanodontidae, including the species iguanodon, Ouranosaurus, and Muttaburrasaurus;

I. Family Spinosauridac, including the species Spinosaurus, and Acrocanthosaums.

* * * * *